(12) United States Patent
Sakurai et al.

(10) Patent No.: US 9,247,025 B2
(45) Date of Patent: Jan. 26, 2016

(54) METHOD AND DEVICE FOR GUARANTEEING PERFORMANCE IN STREAM DATA PROCESSING

(75) Inventors: Takao Sakurai, Tokyo (JP); Tomohiro Hanai, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/820,048

(22) PCT Filed: Jan. 26, 2011

(86) PCT No.: PCT/JP2011/051484
§ 371 (c)(1),
(2), (4) Date: Mar. 21, 2013

(87) PCT Pub. No.: WO2012/056732
PCT Pub. Date: May 3, 2012

(65) Prior Publication Data
US 2013/0204931 A1    Aug. 8, 2013

(30) Foreign Application Priority Data

Oct. 25, 2010    (JP) .................................. 2010-238782

(51) Int. Cl.
| | |
|---|---|
| G06F 15/16 | (2006.01) |
| H04L 29/06 | (2006.01) |
| H04L 12/811 | (2013.01) |
| H04L 12/835 | (2013.01) |
| H04L 12/801 | (2013.01) |

(52) U.S. Cl.
CPC .............. *H04L 67/42* (2013.01); *H04L 47/12* (2013.01); *H04L 47/30* (2013.01); *H04L 47/38* (2013.01); *H04L 47/10* (2013.01)

(58) Field of Classification Search
CPC .. H04L 12/5693; H04L 47/10; H04L 65/4007
USPC ......................... 709/223, 224, 226, 231, 233
See application file for complete search history.

(56) References Cited

U.S. PATENT DOCUMENTS

| | | | | |
|---|---|---|---|---|
| 5,408,465 | A | * | 4/1995 | Gusella et al. ................ 370/231 |
| 6,006,264 | A | * | 12/1999 | Colby et al. .................. 709/226 |

(Continued)

FOREIGN PATENT DOCUMENTS

| | | |
|---|---|---|
| JP | 2003-69109 A | 3/2003 |
| JP | 2007-034375 A | 2/2007 |

(Continued)

*Primary Examiner* — Wing F Chan
*Assistant Examiner* — Joseph Maniwang
(74) *Attorney, Agent, or Firm* — Mattingly & Malur, PC

(57) ABSTRACT

A method and device for guaranteeing performance of stream data processing wherein a latency guarantee and a processing accuracy guarantee are possible while ensuring a real-time property. An execution system determination unit evaluates an amount of data currently present in a queue of an input data reception unit, calculation time, and the processing accuracy. Then, during a query process, if the amount of data in the queue increases for some reason, and is likely to be larger than the requested latency, the execution system determination unit changes the system to a calculation system by which the latency can be reduced within a range that a final quality can be allowed, on the basis of the evaluation result. Under the condition that the accuracy is reduced, if the latency is likely to be greatly lower than the requested latency, the system changes to a calculation system having a higher processing accuracy.

13 Claims, 12 Drawing Sheets

(56) References Cited

U.S. PATENT DOCUMENTS

| | | | |
|---|---|---|---|
| 7,616,640 B1* | 11/2009 | Sitaraman | H04L 12/2872 370/395.1 |
| 7,739,083 B2 | 6/2010 | Naono et al. | |
| 8,228,929 B2* | 7/2012 | Aybay et al. | 370/412 |
| 2003/0012136 A1* | 1/2003 | Walles | 370/229 |
| 2006/0288397 A1* | 12/2006 | Uchida | H04N 21/26208 725/115 |
| 2008/0005392 A1 | 1/2008 | Amini et al. | |
| 2009/0059937 A1* | 3/2009 | Kanada | 370/401 |
| 2009/0070489 A1* | 3/2009 | Lu et al. | 709/245 |
| 2010/0146242 A1* | 6/2010 | Lee | G06F 15/7842 712/30 |
| 2010/0229178 A1* | 9/2010 | Ito | G06F 9/5083 718/104 |

FOREIGN PATENT DOCUMENTS

| | | |
|---|---|---|
| JP | 2009-122925 A | 6/2009 |
| JP | 2010-206486 A | 9/2010 |

\* cited by examiner

FIG. 4

```
                                                         400
REGISTER STREAM sa(id VARCHAR(30), val1 DOUBLE, val2 DOUBLE);

REGISTER QUERY q1
  ISTREAM(
    SELECT sa.id, sin(sa.val1) AS val1, sa.val2
      FROM sa[NOW]
);

REGISTER QUERY q2
    SELECT id, q1.val1 + cos(q1.val2) AS val
      FROM q1[NOW]
    GROUP BY id;

REGISTER QUERY q3
ISTREAM(SELECT * FROM q2);
```

FIG. 5

```
public double sin(double x) {
    int a,k,tmp;
    int methodID=getmethodID().sinID();
    double sol=x;
    switch (methodID) {
    case METHOD1:
        a=3;
    case METHOD2:
        a=9;
    case METHOD3:
        a=25;
    }
    tmp=1;
    for(k=1; k<a; k++){
    tmp=tmp*(-(2*k+1));
    sol += pow(x,2*k+1)/tmp;
    }
    return sol;
} public double cos(double x) {
    int a,k,tmp;
    int methodID=getmethodID().cosID();
    double sol=1.000;
    switch (methodID) {
    case METHOD1:
        a=2;
    case METHOD2:
        a=13;
    case METHOD3:
        a=31;
    }
    tmp=1;
    for(k=1; k<a; k++){
    tmp=tmp*(-(2*k));
    sol += pow(x,2*k)/tmp;
    }
    return sol;
}
```

FUNCTION sin    600

| METHOD # | CALCULATION PERIOD |
|---|---|
| a | SHORT |
| b | INTERMEDIATE |
| c | LONG |

800

| QUEUE CAPACITY | 10000 |
|---|---|
| REQUESTED PERFORMANCE | 40 msec |

FIG. 8B

| METHOD # | CALCULATION PERIOD |
|---|---|
| a | 14 msec |
| b | 40 msec |
| c | 60 msec |

FIG. 8C

| METHOD # | CALCULATION PERIOD | APPLICABILITY |
|---|---|---|
| a | 14 msec | APPLICABLE |
| b | 40 msec | APPLICABLE |
| c | 60 msec | NOT APPLICABLE |

(a) FUNCTION sin  1001

| METHOD # | CALCULATION PERIOD | ACCURACY |
|---|---|---|
| a | SHORT | 1e-03 |
| b | INTERMEDIATE | 1e-05 |
| c | LONG | 1e-08 |

(b) FUNCTION cos  1002

| METHOD # | CALCULATION PERIOD | ACCURACY |
|---|---|---|
| $\alpha$ | SHORT | 1e-02 |
| $\beta$ | INTERMEDIATE | 1e-06 |
| $\gamma$ | LONG | 1e-10 |

FIG. 11

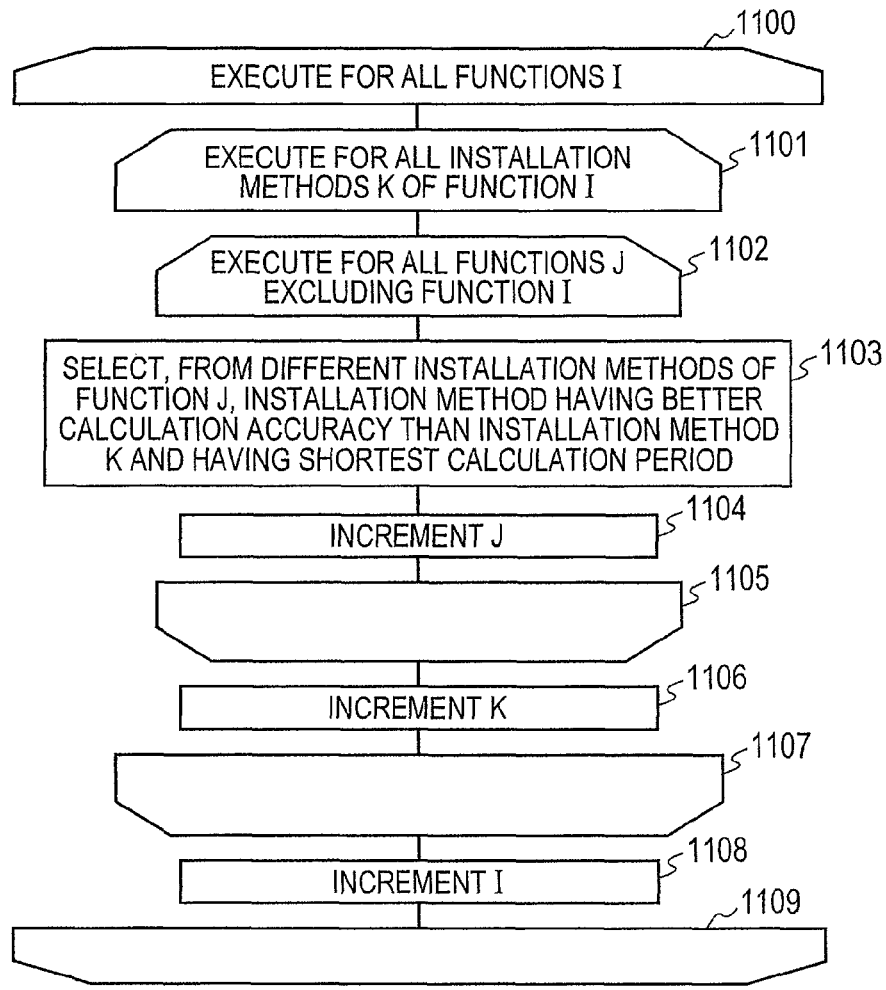

- 1100 EXECUTE FOR ALL FUNCTIONS I
- 1101 EXECUTE FOR ALL INSTALLATION METHODS K OF FUNCTION I
- 1102 EXECUTE FOR ALL FUNCTIONS J EXCLUDING FUNCTION I
- 1103 SELECT, FROM DIFFERENT INSTALLATION METHODS OF FUNCTION J, INSTALLATION METHOD HAVING BETTER CALCULATION ACCURACY THAN INSTALLATION METHOD K AND HAVING SHORTEST CALCULATION PERIOD
- 1104 INCREMENT J
- 1105
- 1106 INCREMENT K
- 1107
- 1108 INCREMENT I
- 1109

FIG. 12

| SET # | ACCURACY | FUNCTION 1 | FUNCTION 2 |
|---|---|---|---|
| i | 1e-02 | a | $\alpha$ |
| ii | 1e-03 | a | $\beta$ |
| iii | 1e-05 | b | $\beta$ |
| iv | 1e-06 | c | $\beta$ |
| v | 1e-08 | c | $\gamma$ |

| SET # | SWITCHING PERIOD |
|---|---|
| i | 1 msec |
| ii | 2 msec |
| iii | 3 msec |
| iv | 6 msec |
| v | 10 msec |

| QUEUE CAPACITY | 5000 |
|---|---|
| REQUESTED PERFORMANCE | 40 msec |
| REQUESTED ACCURACY | 1e-03 |

FIG. 15B

| METHOD # | CALCULATION PERIOD | SWITCHING PERIOD | TOTAL PERIOD |
|---|---|---|---|
| i | 14 msec | 4 msec | 15 msec |
| ii | 18 msec | 2 msec | 20 msec |
| iii | 31 msec | 3 msec | 34 msec |
| iv | 35 msec | 6 msec | 41 msec |
| v | 45 msec | 10 msec | 55 msec |

FIG. 15C

| METHOD # | CALCULATION PERIOD | SWITCHING PERIOD | TOTAL PERIOD | ACCURACY | APPLICABILITY |
|---|---|---|---|---|---|
| i | 14 msec | 1 msec | 15 msec | 1e-02 | NOT APPLICABLE |
| ii | 18 msec | 2 msec | 20 msec | 1e-03 | APPLICABLE |
| iii | 31 msec | 3 msec | 34 msec | 1e-05 | APPLICABLE |
| iv | 35 msec | 6 msec | 41 msec | 1e-06 | NOT APPLICABLE |
| v | 45 msec | 10 msec | 55 msec | 1e-08 | NOT APPLICABLE |

FIG. 17

| SWITCHING TIME | SET |
|---|---|
| 11:20:21 | iv |
| 11:25:54 | v |
| 11:27:13 | iv |
| 11:50:03 | iii |
| 11:50:06 | iv |

FIG. 18

REQUESTED PERFORMANCE AND ACCURACY SETTING

☑ ENABLE AUTOMATIC SELECTION FUNCTION OF EXECUTION METHOD

☑ MAKE SELECTION IN A MANNER SUCH THAT LATENCY IS REDUCED AS MUCH AS POSSIBLE

[ 50 ] msec

☑ MAKE SELECTION IN A MANNER SUCH THAT LATENCY BECOMES AS SMALL AS POSSIBLE

☑ MAKE SELECTION IN A MANNER SUCH THAT OUTPUT DATA RELIABILITY DOES NOT FALL BELOW SPECIFIED VALUE

[ 1.0E-08 ]

[ CARRY OUT OPTIMIZATION ]  [ MAKE SETTING ]

METHOD AND DEVICE FOR GUARANTEEING PERFORMANCE IN STREAM DATA PROCESSING

TECHNICAL FIELD

The present invention relates to a stream data processing system and more specifically to a technology of guaranteeing performance such as latency and processing accuracy in stream data processing.

BACKGROUND ART

Normal stream data processing continuously performs processing, judgment, interpolation, estimation, etc. on continuous data (see Patent Literature 1). However, upon a sudden data increase, latency is increased, and the real-time property desired by the user can no longer be maintained.

On the other hand, in a numerical value calculation field, there is a method of previously preparing a plurality of calculation systems, and by using past calculation results of each calculation system, in a manner such as to satisfy latency and processing accuracy requested by the user, making an automatic selection of a calculation system that is to be used (see Patent Document 2).

CITATION LIST

Patent Literature

Patent Literature 1: US Patent Application Laid-open US 2008/0005392
Patent Literature 2: Japanese Patent Application Laid-open No. 2007-34375

SUMMARY OF INVENTION

Technical Problem

In the stream data processing, upon sudden data increase as described above, different actions (whether or not to maintain the latency even while accuracy is reduced and conversely, whether or not to maintain the accuracy even while sacrificing the latency to some extent) need to be taken depending on applications. For example, even while sacrificing the accuracy to some extent for estimation of power consumption of the next time in each household, image real-time compression processing, prediction of information device failure indication, etc., the latency needs to be maintained. Conversely, the accuracy cannot be reduced for a security field, economic index calculation, etc. There are demands for a mechanism that permits inputting of such an application request and supporting it.

In Patent Literature 1, a capability of applying to a query an external definition function created by a vendor is installed in a server, and in order to guarantee latency therein, sorting to a different server is performed or part of input tuple is eliminated from a resource used amount of the server, which raises a problem that a plurality of servers are required or that there arises a risk that acquired results differ as a result of eliminating part of the input data.

Thus, in a case where it is considered to apply the method of the numerical calculation field in Patent Literature 2 to the external definition function in the stream data processing in Patent Literature 1, means for estimating latency beforehand is not sufficient, thus raising a problem of delayed calculation system switching. Moreover, there is no mechanism of controlling the whole, and thus there arises a problem that each function selects a calculation system without considering latency and processing accuracy of the entire processing.

It is an object of the invention to solve the problems described above and provide a method and a device for guaranteeing performance in stream data processing capable of guaranteeing latency and further guaranteeing processing accuracy while ensuring real-time property.

Solution to Problem

To address the object described above, provided in the present invention is a performance guarantee method in stream data processing executed by a computer provided with a processing unit and an interface unit. The performance guarantee method includes a plurality of execution systems with different processing performances for the stream data processing. The processing unit estimates, upon execution of the stream data processing on input data received via the interface unit, a performance value based on an amount of the unprocessed input data, determines, based on the estimated performance value, the execution system that satisfies a requested performance value, makes switching to the determined execution system and executes the stream data processing, and outputs processing results as output data to the interface unit.

Moreover, to address the object of the invention, there is provided, in the invention, a performance guarantee device in stream data processing includes: an input data reception unit receiving input data; a processing unit executing query processing on the input data; a data transmission unit outputting execution results as output data; and a request input unit receiving a requested performance value, wherein the processing unit includes a plurality of execution systems with different processing performances for the query processing, upon execution of the query processing on input data received via the input data reception unit, estimates a performance value based on an amount of the unprocessed input data, determines, based on the estimated performance value, the execution system satisfying the requested performance value, executes the query processing by making by the determined execution system, and outputs processing results as output data to the data transmission unit.

Specifically, to achieve the object described above, in best modes of the invention, for each calculation execution system used in query processing, an amount of data in a queue, a calculation time, and processing accuracy at this point are evaluated. Moreover, final processing accuracy with a set of calculation systems is also evaluated. This evaluation may be performed beforehand or may be accumulated during execution. Then during the execution, when the amount of data in the queue increases for some reason and is likely to become greater than requested latency, a change to a set of calculation systems that reduces the latency within a range permitting final quality is made. Conversely, in a case where the latency is likely to become greatly smaller than the requested latency while the accuracy is reduced, a change to a set of calculation systems with high processing accuracy is made.

Advantageous Effects of Invention

According to an aspect of the invention, a stream data processing technology can be provided which is capable of selecting calculation contents considering latency and quality of the entire processing and satisfying user requests on the entire system.

BRIEF DESCRIPTION OF DRAWINGS

FIG. 4 is a diagram showing one example of data processing definition according to the first embodiment.

FIG. 5 is a diagram showing one example of a function including a plurality of execution systems used in the data processing definition shown in FIG. 4.

FIG. 8B is a diagram showing one example of performance values estimated based on the queue capacity and execution results held by the execution result acquisition unit according to the first embodiment.

FIG. 8C is a diagram showing one example of judgment by a latency evaluation unit on whether or not to apply the execution systems according to the first embodiment.

FIG. 11 is a diagram showing a flow chart showing operation of selecting the effective execution system in the stream data processing system according to the second embodiment.

FIG. 12 is a diagram showing one example of a set of the selected effective execution systems according to the second embodiment.

FIG. 15B is a diagram showing one example of performance values estimated based on the queue capacity, the held execution results, and the execution system switching periods according to the second embodiment.

FIG. 15C is a diagram showing one example of judgment on whether or not to apply the execution systems according to the second embodiment.

FIG. 17 is a diagram showing one example of record of the execution system switching clock times according to the second embodiment.

FIG. 18 is a diagram showing one example of GUI (Graphical User Interface) for setting the requested performance and the requested accuracy according to the second embodiment.

DESCRIPTION OF EMBODIMENTS

Hereinafter, embodiments of the present invention will be described in detail based on the drawings. In all the drawings for illustrating the embodiments, the same members are basically provided with the same numerals and their repeated description will be omitted. Moreover, in this specification, a program executed by, for example, a computer forming a processing server that executes stream data processing, that is, query processing on inputted stream data may be called, for example, "capability", "means", or "unit". For example, capability of an execution method determination program is called "execution system determination function", "execution system determination means", or "an execution system determination unit".

First Embodiment

First, referring to FIGS. 1 and 2, basic configuration of a system executing stream data processing according to the first embodiment will be described.

Figure 1:
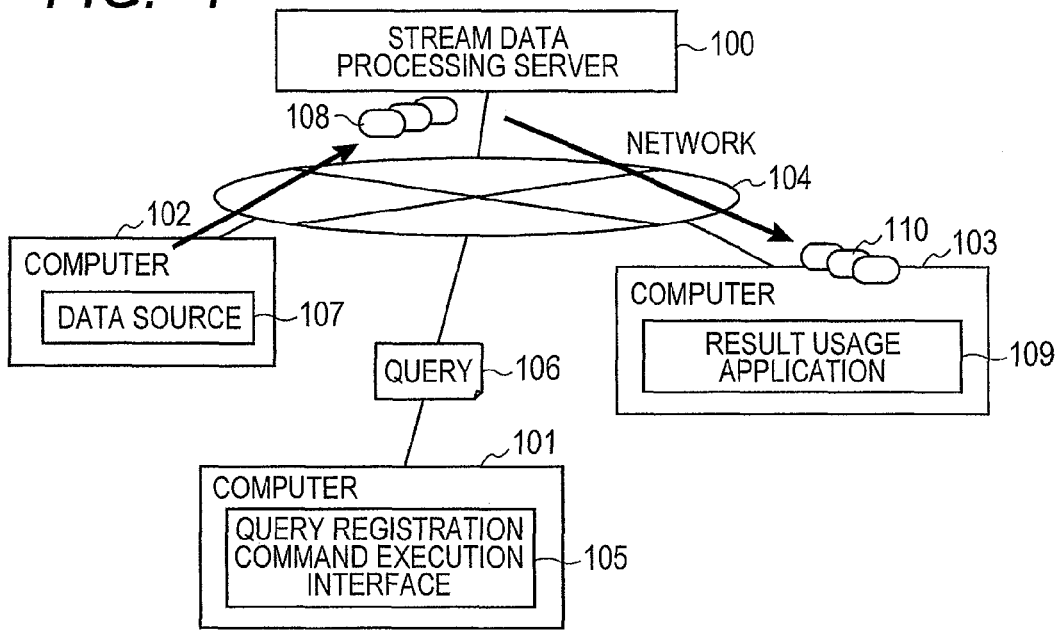
FIG. 1 is a diagram showing one example of configuration of computer environment using a stream data processing server according to a first embodiment.

As shown in FIG. 1, in the system executing the stream data processing, to a network 104, a stream data processing server 100, computers 101, 102, and 103 are connected. The stream data processing server 100 receives, via the network 104, data 108 from the computer 102 where a data source 107 operates, and transmits data 110 as processing results to a result-using application 109 on the computer 103. Moreover, on the computer 101, a query registration command execution interface 105 for registering a query for the stream data processing operates. Any two or three of these computers 101, 102, and 103 can be formed by one computer or may be integrated into the stream data processing server 100.

Figure 2:
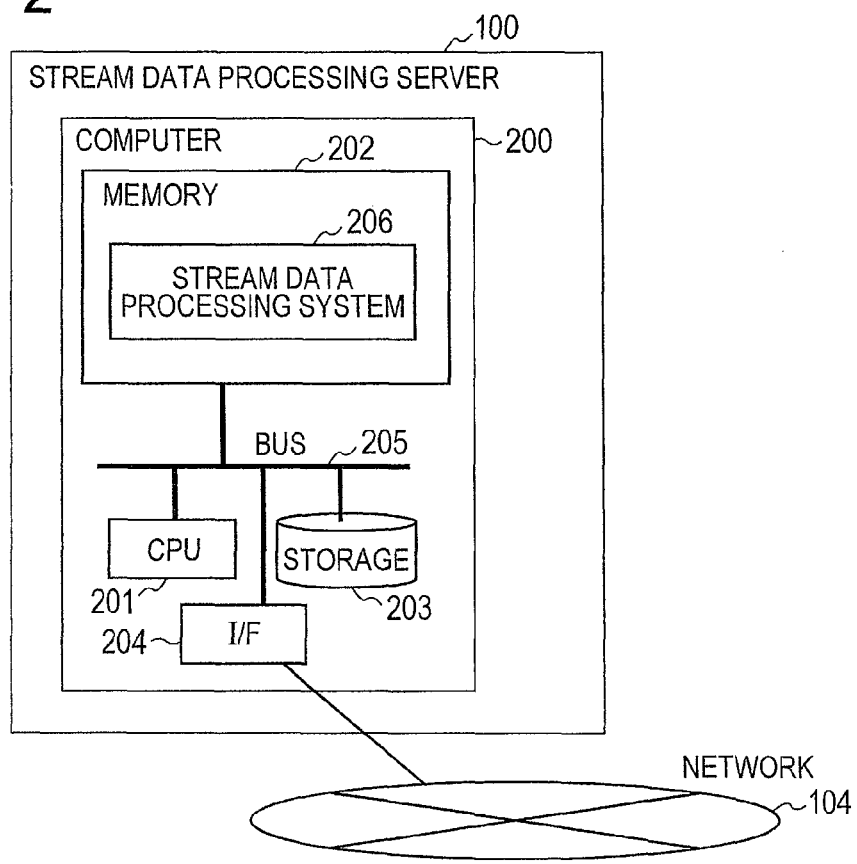
FIG. 2 is a diagram showing one example of configuration of the stream data processing server according to the first embodiment.

As shown in FIG. 2, the stream data processing server 100 is composed of a computer 200, which is composed of: a memory 202 as a storage unit, a central processing unit (CPU) 201 as a processing unit, a network interface (I/F) 204, a storage 203 as a storage unit, and a bus 205 coupling them together. Arranged on the memory 202 is a stream data processing system 206 that defines logic operation of the stream data processing. The stream data processing system 206 is an execution image that can be interpreted by the CPU 201 as described in detail below.

As shown in FIG. 2, the computer 200 forming the stream data processing server 100 is connected to the network 104 outside via the network I/F 204 as the interface unit. The number of computers forming the stream data processing server 100 is not limited to one and may be a plural number, but configuration of one computer is illustrated here.

When the computer 200 forming the stream data processing server 100 has received a query 106 defined by the user via the query registration command execution interface 105 that operates on the computer 101 connected to the network 104, the stream data processing system 206 forms therein a query graph that permits execution of the stream data processing in accordance with this definition. Then when the computer 200 forming the stream data processing server 100 has received data 108 transmitted by the data source 107 that operates on the computer 102 connected to the network 104, data processing is performed in accordance with this query graph, and result data 110 is generated and transmitted to the result-using application 109 that operates on the computer 103. The storage 203 saves the stream data processing system 206 and also the query 106 once received. The stream data processing system 206 can load this definition from the storage 203 upon startup and form a query graph.

The configuration of the stream data processing server of this embodiment described here is one example, and the number of computers is not necessarily one but it may be composed of a plurality of computers, the CPU 201 as the processing unit of the computer may be composed of two processors on the same computer, and further the two processors may be two calculation cores in one multicore CPU. In this specification, the server may be configured in any way as long as it includes at least the processing unit, the storage unit, and the interface unit.

Figure 3:
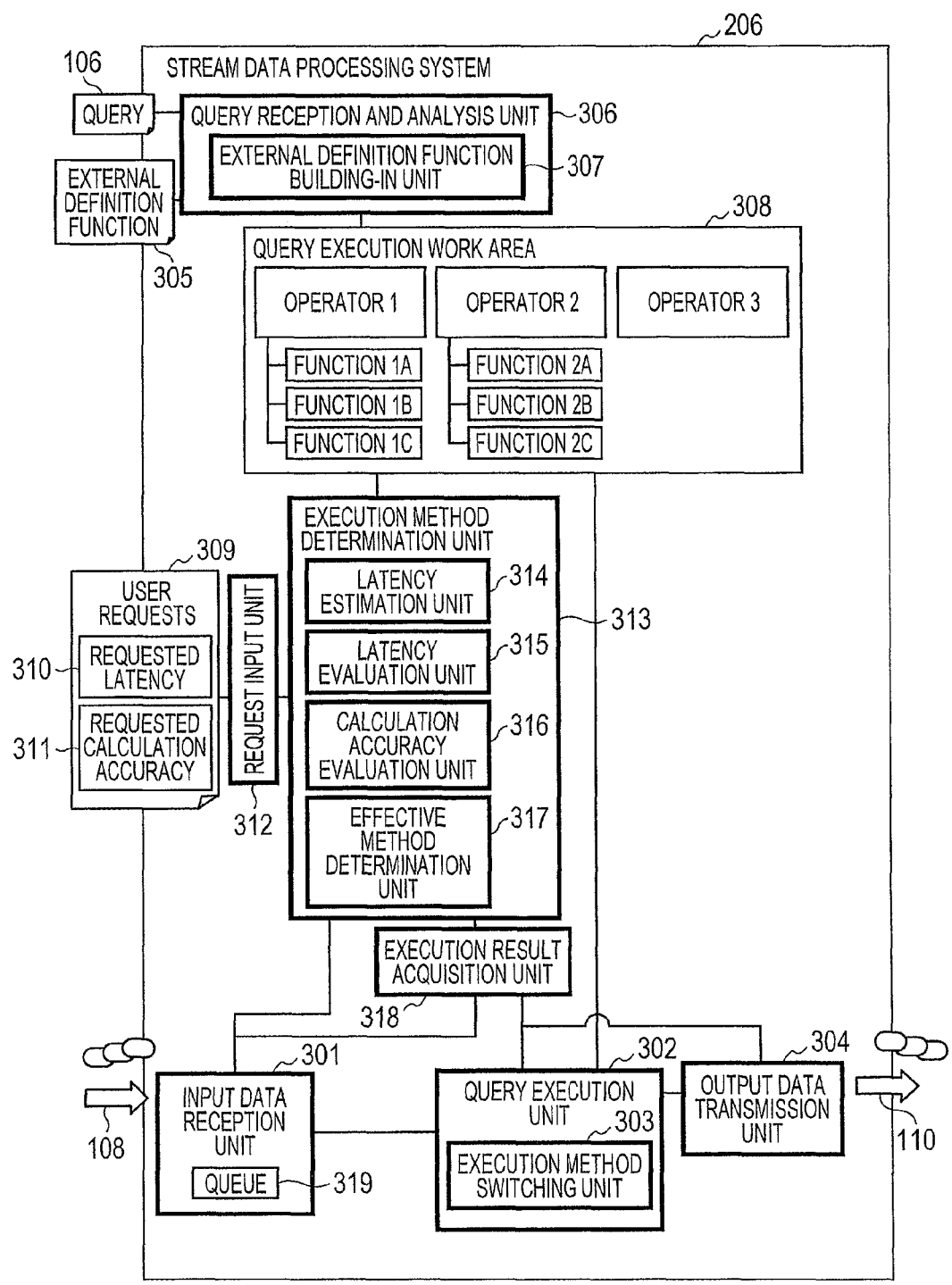
FIG. 3 is a diagram showing one example of performance guarantee software capability in a stream data processing system according to the first embodiment.

FIG. 3 is a diagram showing functional block configuration of software that executes a performance guarantee method of the stream data processing system according to the first embodiment. In the same figure, blocks formed by thick lines schematically show various kinds of software capabilities executed by the CPU 201 as the processing unit of the computer 200 and blocks formed by thin lines schematically show saving regions of various kinds of data formed on, for example, the memory 202 upon software execution. Moreover, the functional block configuration diagram of the software also serves as a diagram showing software functional block configuration of a stream data processing system according to the second embodiment, and as described below, it is to be noted that part of the functional blocks and data are not used in the first embodiment.

In FIG. 3, the stream data processing system 206 includes: an input data reception unit 301 receiving the input data 108; a query reception and analysis unit 306 receiving and analyzing the query 106 defined by the user and an external definition function 305; a query execution work area 308 holding the query graph, operators, etc.; a query execution unit 302 executing a query based on the query execution work area 308 and the input data 108 in the query reception and analysis unit 306; a request input unit 312 to which a user request 309 composed of requested latency 310 as a requested performance value is inputted; and an output data transmission unit 304 outputting a query execution result 110.

In addition, the stream data processing system 206 includes: the request input unit 312 receiving the user request 309 composed of the requested latency 310; an execution system determination unit 313; an execution result acquisition unit 318 receiving from the input data receiving part clock time at which data was inputted and capacity of the queue 319 at that time, also receiving from the query execution unit 302 an execution system of a function used upon processing of this data, receiving from the output data transmission unit 304 passage clock time at which this processed data was outputted, measuring latency based on difference between the clock time at which the data was outputted and clock time at which the data was inputted, and recording the measured latency together with the capacity of the queue at this point and information of the used system; and the execution system determination unit 313 determining, based on the information recorded by the execution result acquisition unit 318, a function that satisfies the user request 309 received by the request input unit 312.

Note that in this specification, the input data reception unit 301, the output data transmission unit 304, and further the request input unit 312 may be collectively called an interface unit, and this interface unit may be identical to an interface unit of FIG. 2 but they are not necessarily identical to each other and this interface unit can be preferably a functional interface unit of the stream data processing system itself that operates on the stream data processing server 100.

Here, the queue 319, the input data reception unit 301 holds unprocessed data of the stream data processing system 206. Moreover, the query reception and analysis unit 306 includes an external definition function building-in unit 307 that builds the external definition function 305 in the query execution work area 308.

The query execution work area 308 includes operators 1 to 3 indicating respective processing contents. Here, the operator 1 further includes built-in functions 1, which include methods 1A, 1B, and 1C, and the operator 2 further includes built-in functions 2, which include methods 2A, 2B, and 2C. Here, the built-in functions 1A, 1B, and 1C are a plurality of functions that perform the same calculation, but they have different calculation accuracy and calculation times in this embodiment. The same applies to the built-in functions 2A, 2B, and 2C of the operator 2.

The query execution unit 302 according to this embodiment includes an execution system switching unit 303 that dynamically changes the system of the function to be used in query execution in accordance with the determination of the execution system determination unit 313. Moreover, the execution system determination unit 313 includes: a latency estimation unit 314 which receives the capacity of the queue 319 from the input data reception unit and which estimates, based on past information recorded by the execution result acquisition unit 318, latency when each system of the function is used; and a latency evaluation unit 315 that evaluates the usable system based on the estimation of the latency estimation unit 314 and the requested latency 310 of the user.

Requested calculation accuracy 311 in the user request 309 and a calculation accuracy evaluation unit 316 and an effective method determination unit 317 in the execution system determination unit 313, which are shown in FIG. 3 are portions related to the second embodiment, and they will be described in detail below and thus their description is omitted here.

Next, referring to FIGS. 4 and 5, one example of query processing in the stream data processing of this embodiment will be described. FIG. 4 is a diagram showing one example of data processing definition, and as shown in the same figure, data processing definition 400 is a query that defines two input streams sa and sb and three queries q1, q2, and q3. Numeral 500 of FIG. 5 is a diagram showing one example of a function including a plurality of execution systems used in the data processing definition shown in FIG. 4. The query reception and analysis unit 306 of the stream data processing system 206 shown in FIG. 3 receives and analyzes the query shown in FIG. 4 and builds in a necessary external definition function. The data processing definition 400 and a function example 500 shown in FIGS. 4 and 5 are just one example, and not limited to this example.

Figures 6, 7, 8A:
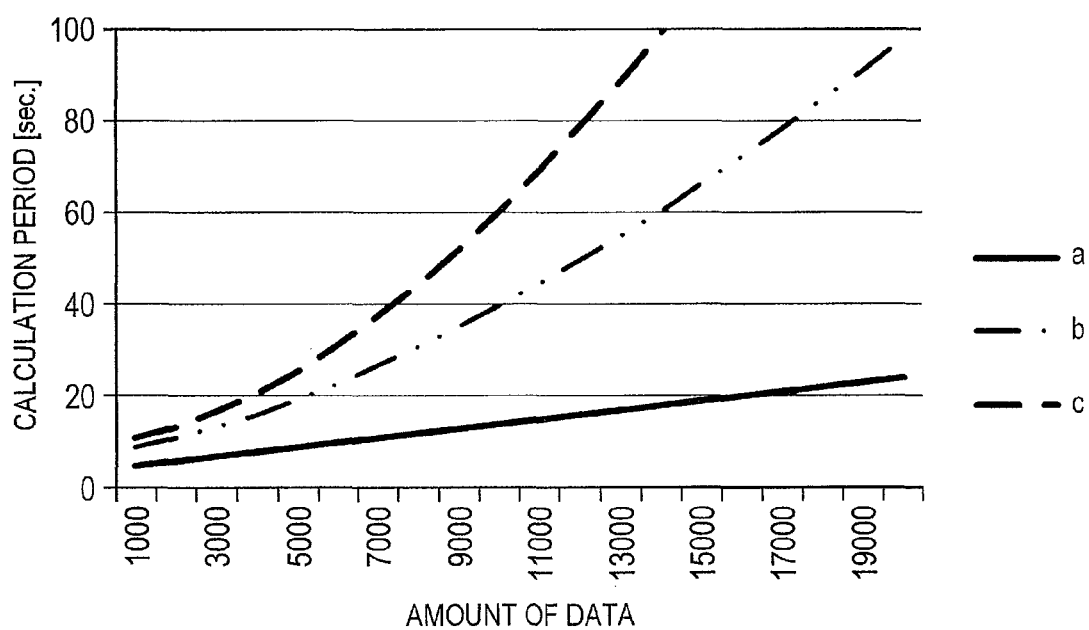
FIG. 6 is a diagram showing one example in which a plurality of execution systems are arrayed in one function according to the first embodiment.
FIG. 7 is a diagram showing one example of execution results of the respective execution systems of FIG. 6 acquired by an execution result acquisition unit.
FIG. 8A is a diagram showing one example of queue capacity and a requested performance value of input data according to the first embodiment.

Subsequently, referring to FIG. 6, a plurality of calculation system for each function described above in the stream data processing system of this embodiment will be described. Numeral 600 of FIG. 6 is a table which is provided for the stream data processing system of this embodiment to execute a predetermined function and which holds calculation times corresponding to a plurality of execution systems. In the same figure, as one example of the plurality of systems for a predetermined function, an example of a function sin is illustrated. In the same figure, the methods a, b, and c respectively have the calculation times: short, intermediate, and long.

FIG. 7 is a diagram in a graph showing one example of execution results of the respective execution systems acquired and held by the execution result acquisition unit 318. In correspondence with the function sin calculation systems a, b, and c shown in FIG. 6, amounts of calculation data are plotted at a horizontal axis and the calculation times are plotted at a vertical axis. In the same figure, a solid line shows the execution results of the method a, a two-dot chain line shows the execution results of the method b, and a broken line shows the execution results of the method c.

In the stream data processing system 206 of this embodiment shown in FIG. 3, as described above, the execution system determination unit 313, based on the information acquired and held by the execution result acquisition unit 318, determines the function that satisfies the user request 309 as the requested performance value received by the request input unit 312. The execution system switching unit 303 of the query execution unit 302, in accordance with the determination of the execution system determination unit 313, dynamically changes the system of the function used in the query execution. Moreover, the latency estimation unit 318 of the execution system determination unit 313 receives the capacity of the queue 319 of the data 108 from the input data reception unit 301, and estimates, based on the past information recorded by the execution result acquisition unit 318, latency when each system of the function is used, and the latency evaluation unit 315 evaluates the usable system based on the estimation of the latency estimation unit 314 and the requested latency 310.

Specifically, in the execution system determination unit 313 of the stream data processing system 206, clock time at which the data was inputted and the capacity of the queue 319 at that time are received from the input data reception unit 301, also the execution system of the function used upon processing of this data is received from the query execution unit 302, and passage clock time at which this processed data is outputted is received from the output data transmission unit 304. Then the execution result acquisition unit 318 measures latency based on difference between clock time at which this data was outputted and clock time at which it was inputted, and records the measured latency together with the capacity of the queue and the used system at this point. Then the execution system determination unit 313, based on the information held by the execution result acquisition unit 318, determines the function that satisfies the user request 309 received by the request input unit 312.

Numeral 800 of FIG. 8A shows one example of queue capacity given to the execution system determination unit 313 by the input data reception unit 301 and a requested performance value given by the request input unit 312. Here, the requested performance value shows requested latency. Similarly, numeral 801 of FIG. 8B shows one example of performance values estimated based on the queue capacity given to the latency estimation unit 314 and the execution results held by the execution result acquisition unit 318. Here, the estimated performance values show calculation times required for the respective execution systems. Moreover, numeral 802 of FIG. 8C shows one example of evaluation results obtained after evaluation by the latency evaluation unit 315 on whether or not the execution system is applicable.

Specifically, as shown in FIGS. 8A, 8B, and 8C, in a case where the data capacity of the queue 319 is 10000, the requested latency 310 from the user is 40 ms, and the calculation times of the systems a, b, and c are 14 ms, 40 ms, and 60 ms, the systems a and b are determined to be applicable and the system c is determined to be not applicable. These pieces of data are acquired by the execution result acquisition unit 318 of FIG. 3 and held therein and in other parts.

Figures 9, 10:
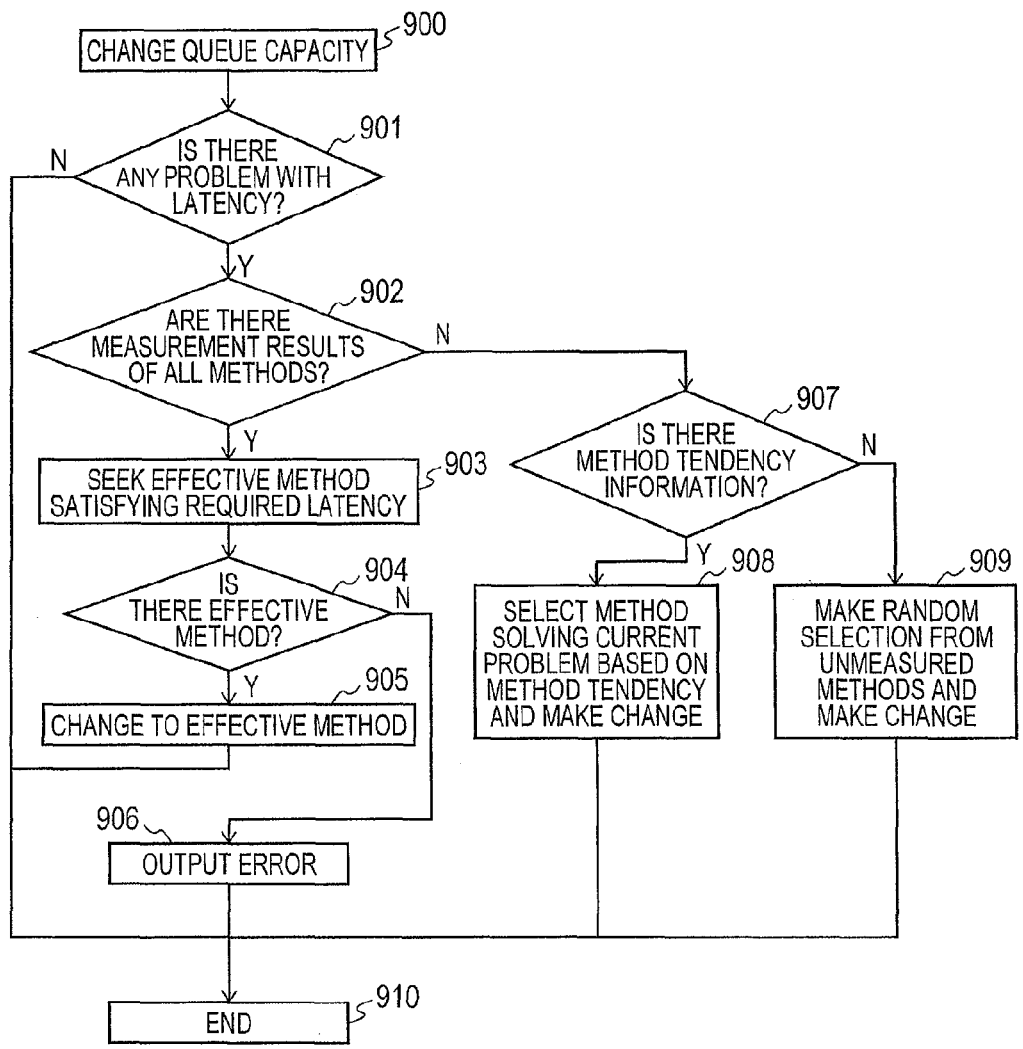
FIG. 9 is a diagram showing a flow chart showing operation of switching the execution system in the stream data processing system according to the first embodiment.
FIG. 10 is a diagram showing one example of execution systems of a plurality of functions in a stream data processing system according to a second embodiment.

FIG. 9 is a flow chart showing operation of dynamically switching a plurality of execution systems performed by the execution system determination unit 313 and the query execution unit 302 of the stream data processing system 206 of this embodiment. First, in a case where there is a change in the queue capacity of the data 108 inputted to the input data reception unit 301, a processing flow starts (step 900, hereinafter step is omitted in brackets).

The execution system determination unit 313 judges whether or not there is any problem with the latency (901). If there is any problem with the latency (Y), it is judged whether or not there are measurement results of the plurality of systems in the execution result acquisition unit 318 (902). If there isn't any problem (N), the processing ends (910).

If there are measurement results of the plurality of systems (Y), the effective system that satisfies the requested latency is subsequently searched (903). As a result, if there is the effective system (Y), this effective system is changed (905), and the processing ends (910). If there is no effective system, an error is outputted (906) and the processing ends (910).

In step 902, if there are no measurement results of all the systems (N), it is checked whether or not system tendency information is stored in the execution result acquisition unit 318, etc. beforehand (907), and if there is system tendency information, from this system tendency information, the system that can solve the current problem is selected and system switching change is performed (908). If there is no tendency information, in this embodiment, random selection is made from the unmeasured systems and a change is executed (909). Note that this system tendency information can be held in, for example, the execution result acquisition unit 318 when necessary at time of system configuration.

It is also possible to configure the execution system determination unit 313 of the stream data processing system, which is executed on the CPU as the processing unit of this embodiment, in a manner such as to make determination to switch the execution system upon increase in the amount of the unprocessed input data in a state in which the acquired performance value exceeds the requested performance value. Moreover, needless to say, it is also possible to provide configuration such that the past performance values held in the execution result acquisition unit 318 and the amount of the unprocessed input data are compared to each other and switching to the execution system that satisfies the requested performance value is determined.

According to the stream data processing system of the first embodiment described above in detail, based on the amount of data received by the system, with the estimated latency as an index, the execution system for calculation on the received data can be switched and selected, making it possible to guarantee latency while ensuring real time property.

Second Embodiment

Subsequently, as the second embodiment, a stream data processing system capable of guaranteeing not only latency but also processing accuracy will be described. Note that in the description of this embodiment, portions in common with those in the description of the first embodiment will be omitted from the description. Configuration of computer environment used by a stream data processing server of this embodiment and configuration of the stream data processing server are the same as those of FIGS. 1 and 2, and thus they will be omitted from the description here.

As described in the description of FIG. 3, in the performance guarantee software functional diagram in the stream data processing of FIG. 3, there are data and capability used only in this embodiment. That is, in FIG. 3, included in the user request 309 is, in addition to the requested latency 310, requested calculation accuracy 311 as requested accuracy used only in this embodiment. Included in the execution system determination unit 313 are: in addition to the latency estimation unit 314 and the latency evaluation unit 315, the calculation accuracy evaluation unit 316 and the effective method determination unit 317 used in this embodiment.

In this embodiment, the execution system determination unit 313 evaluates, in addition to the capabilities of the previous first embodiment, output data and measures calculation accuracy, and the execution result acquisition unit 318 records and holds the measured latency and the calculation accuracy together with the queue capacity and information of the used system at that point. Then based on the information recorded and held by the execution result acquisition unit 318, the execution system of one or a plurality of functions that satisfy the user request 309 received at the request input unit 312 is determined.

Here, also in this embodiment, the execution system switching unit 303 of the query execution unit 302, in accordance with the determination of the execution system determination unit 313, dynamically changes the system of the function used in the query execution. Moreover, the execution system determination unit 313, as is the case with the first embodiment, newly includes: in addition to the latency estimation unit 314 that receives the capacity of the queue 319 the input data reception unit and estimates, based on past information recorded by the execution result acquisition unit 318, latency when each system of the function is used and the latency evaluation unit 315 that evaluates the usable system based on the estimation of the latency estimation unit 314 and the requested performance 309 of the user, as described above, a calculation accuracy evaluation unit 316 that evaluates the system satisfying the requested calculation accuracy 311 based on the information recorded by the execution result acquisition unit 318; and an effective method determination unit 317 that determines a set of effective systems when a plurality of built-in functions are used on the query execution work area 308.

FIG. 10 shows one example of the execution systems of the plurality of functions by the latency evaluation unit and the calculation accuracy evaluation unit according to this embodiment. (a) and (b) of FIG. 10 correspond to the function sin and the function cos, respectively. The systems a, b, and c respectively correspond to systems α, β, and γ, and as is the case with FIG. 6, the calculation times: short, intermediate, and long and their accuracy are obtained and held. In the same figure, the accuracy is indicated in index indication.

FIG. 11 is a diagram showing a flow chart showing operation of selecting a set of effective systems by the execution system determination unit 313 when a plurality of built-in functions are used on the query execution work area 308. In the same figure, the plurality of existing functions are sequentially reviewed as sets of functions I and functions J (I, J, and K are natural numbers of 1 or above). That is, of installation systems of the functions J, the installation method whose calculation accuracy is better than that of the installation system K and whose calculation time is shortest among them is selected (1103). This processing is executed for all the functions J excluding the functions I (1102, 1104, and 1105), is executed for all the installation systems K excluding the functions I (1101, 1106, and 1107), is executed for all the functions I (1100, 1108, 1109), and then the processing ends.

Numeral 1200 of FIG. 12 is a diagram showing one example of sets of effective execution systems selected and held as a result of the selection processing in the second embodiment as described above. The set i, ii, iii, iv, and v respectively correspond to accuracies shown, and the function set shown in columns of the function 1 and the function 2 is consequently selected.

Figures 13, 14, 15A:
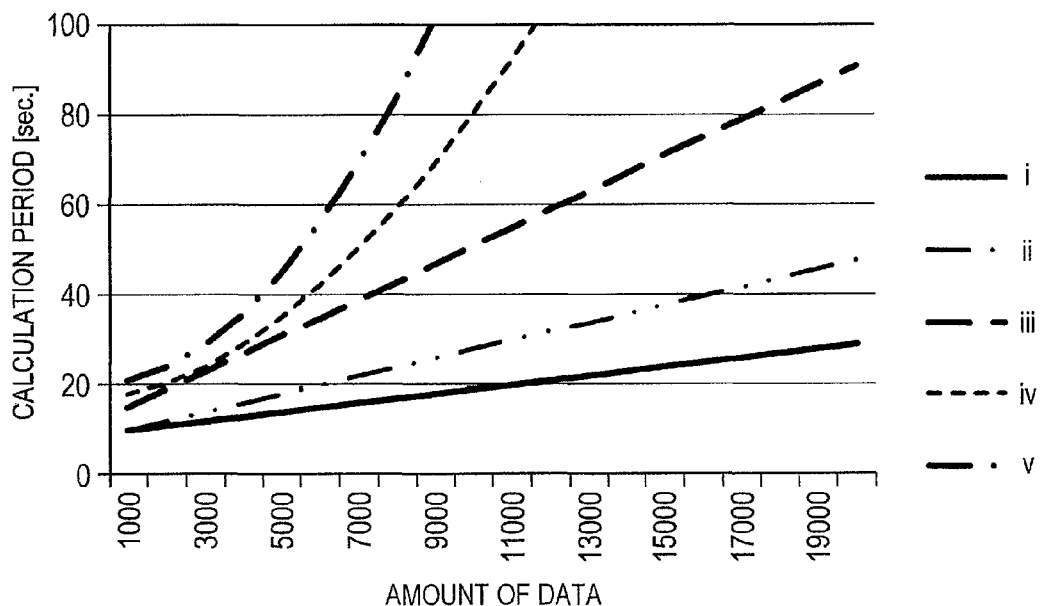
FIG. 13 is a diagram showing one example of results of evaluation on the effective execution systems of a plurality of functions according to the second embodiment.
FIG. 14 is a diagram showing one example of execution system switching periods in the stream data processing system according to the second embodiment.
FIG. 15A is a diagram showing one example of queue capacity, requested performance, and requested accuracy according to the second embodiment.

FIG. 13 is a diagram in a graph showing one example of results of evaluation by the latency evaluation unit 315 of this embodiment shown in FIG. 12 for the sets of the effective execution system for a plurality of functions. The calculation time increases with an increase in accuracy.

FIG. 14 is a diagram showing one example of execution system switching times in the stream data processing system of the second embodiment. The switching times are also held in, for example, the execution result acquisition unit 318. The same figure shows the switching times increase as the accuracies improve.

FIG. 15A shows one example of the queue capacity given to the execution system determination unit 313 by the input data reception unit 301 and the requested performance value and the requested calculation accuracy given by the request input unit 312, FIG. 15B show one example of the queue capacity given to the latency estimation unit 314, the execution results held by the execution result acquisition unit 318, and the performance values estimated based on the execution system switching times, and FIG. 15C shows one example of judgment by the latency evaluation unit 315 and the calculation accuracy evaluation unit 316 also considering the switching times on whether or not the execution systems are applicable. In the example shown in FIG. 15C, it is judged that the system ii and the system iii are applicable in terms of the total time and the accuracy, and it is judged that the remaining three systems are not applicable.

Figure 16:
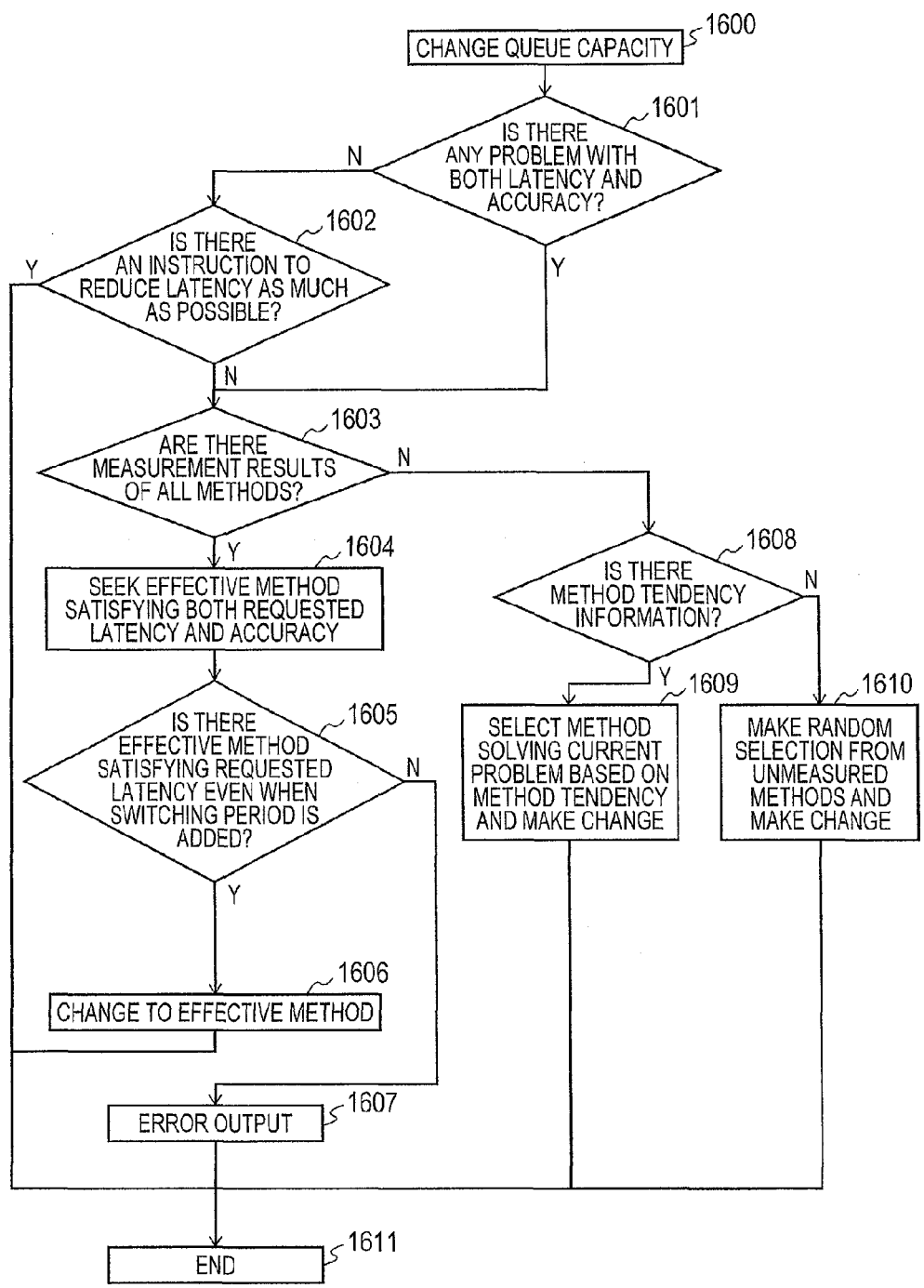
FIG. 16 is a diagram showing a flow chart showing execution system switching operation in view of the requested accuracy and the execution system switching period according to the second embodiment.

FIG. 16 is a diagram showing a flow chart showing operation of switching the execution system by the execution system determination unit 313 and the query execution unit 302 in view of the requested accuracy and the execution system switching time according to this embodiment. In the same figure, as is the case with the flow chart of FIG. 9, when there is a change in the queue capacity of the data 108 inputted to the input data reception unit 301, the processing flow first starts (1600).

The execution system determination unit 313 judges whether or not there is any problem with both the latency and the accuracy (1601). If there isn't any problem (N), it is checked whether or not there is an instruction to reduce the latency as much as possible (1602). If there is such an instruction, the processing ends (1611).

If there is no instruction to reduce the latency as much as possible (N), or if there is any problem with both the latency and the accuracy (Y), it is judged whether or not there are already measurement results of the plurality of system (1603).

If there are measurement results of the plurality of systems (Y), the effective system that satisfies both the requested latency and the accuracy is searched while the switching time is added (1604, 1605). As a result, if there is any effective system (Y), a change to the effective system is made (1606) and the processing ends (1611). If there is no effective system, an error is outputted (1607) and the processing ends (1611).

In step 1603, if there are no measurement results of all the systems (N), as is the case with the first embodiment, it is checked whether or not system tendency information is stored (1608), and if there is any system tendency information, the system that solves the current problem is selected and a change is made (1609). If there is no tendency information, a random selection from the unmeasured systems is made and a change is executed (1610).

In this embodiment, in a case where there are sets of a plurality of execution systems to be switched by one or the plurality of operators of the query processing, with reference to the calculation accuracy of output data, it is also possible to provide configuration such that a set of execution methods having highest performance with the calculation accuracy is determined. That is, in a case where there is a switching point (function) of the plurality of execution systems in the stream data processing, their respective calculation performances and calculation accuracies may be evaluated and the most effective set may be selected.

FIG. 17 shows one example of recording of the execution system switching time acquired and held by the execution result acquisition unit 318 of the stream data processing system of the second embodiment. As is clear from the same figure, identification information of the sets and their corresponding switching times are held. Data holding of the switching times of this figure is not limited to the second embodiment, but is also preferably used in the first embodiment. However, it is needless to say that in the first embodiment, the identification information of the sets is replaced with the identification information of the execution systems and the switching times.

FIG. 18 shows one example of a graphical user interface (GUI) that sets the requested performance and the requested accuracy in this embodiment. It is needless to say that a similar GUI can also be used in the system of the first embodiment, in which case it is needless to say that there is no need of displaying an accuracy setting portion.

In the same figure, in correspondence with the second embodiment, displayed on a GUI screen 1800 is a requested performance and accuracy setting screen. It is needless to say that a device displaying such a display screen can be usually realized by use of a normal display device and image display software. On the GUI setting screen of FIG. 18, selection from "Enable execution system automatic selection capability", "Make selection in a manner such that latency does not exceed specified value", "Make selection in a manner such that accuracy of output data maintains requested accuracy", etc. can be made by providing a mark at a check unit 1803 shown. Moreover, it is needless to say that the requested latency and the requested calculation accuracy can be made possible by appropriately inputting desired numerical values from the screen. Numerals 1802 and 1803 indicate carry out optimization and set instruct buttons, respectively.

With the stream data processing system of the second embodiment described above in detail, based on the amount of data received by the system, with the estimated latency and the calculation accuracy as indices, the execution system of calculation for the received data can be switched and selected, making it possible to guarantee the latency and the processing accuracy while guaranteeing real-time property.

The various embodiments of the present invention have been described above, but the present invention is not limited to them, and it is needless to say that various modified embodiments are included. The embodiments described above are for better understanding of the invention, and the invention is not limited to them. Moreover, it is also possible to replace part of configuration of certain embodiment with configuration of the other embodiment, and it is also possible to add the configuration of the other embodiment to the configuration of the certain embodiment. For example, it is needless to say that the switching method taking the execution system switching time into consideration, which has been described in the second embodiment, can be applied to the first embodiment. Moreover, it is needless to say that the configuration, the capabilities, the processing, etc. of the embodiments described above can be realized as not only software configuration described as part or whole of them but also as special hardware configuration or configuration sharing them.

INDUSTRIAL APPLICABILITY

The present invention is extremely useful as stream processing technology intended to guarantee latency and further processing accuracy in a stream data processing field.

REFERENCE SINGS LIST

100 Stream processing server
101, 102, 103, 200 Computer
104 Network
201 CPU
202 Memory
203 Storage device
204 Network I/F
205 Internal bus
206 Stream data processing system
301 Input data reception unit
302 Query execution unit
303 Execution system switching unit
304 Output data transmission unit
305 External definition function
306 Query reception and analysis unit
307 External definition function building-in part
308 Query execution work area
309 User request
310 Requested latency
311 Requested calculation accuracy
312 Request input unit
313 Execution system determination unit
314 Latency estimation unit
315 Latency evaluation unit
316 Calculation accuracy evaluation unit
317 Effective system determination unit
318 Execution result acquisition unit
319 Queue
1800 GUI screen
1800 Carry-out optimization execute button
1800 Setting execute button

The invention claimed is:

1. A performance guarantee method in stream data processing executed by a computer including a processing unit, an interface unit and a memory, the computer having a plurality of predetermined execution systems with different processing performances, including calculation accuracies and calculation times, for the stream data processing, the performance guarantee method comprising:

acquiring, upon execution of the stream data processing with a first one of the predetermined execution systems on input data received via the interface unit, input passage clock times when unprocessed input data passes through the interface unit;

acquiring an amount of unprocessed input data when the input passage clock times are acquired;

acquiring output passage clock times when output data, which results from the execution of the stream data processing on the input data with the first one of the predetermined execution systems, passes through the interface unit;

storing the amount of unprocessed input data in association with performance information regarding the input passage clock times and the output passage clock times in the memory;

estimating a performance value based on a comparison between a current amount of the unprocessed input data and a previous amount of the unprocessed input data associated with the performance information stored in the memory;

comparing the estimated performance value with a requested performance value; and when the estimated performance value falls below the requested performance value, switching to a second one of the predetermined execution systems, executing the stream data processing with the second one of the predetermined execution systems, and outputting output data, which results from the execution of the stream data processing with the second one of the predetermined execution systems, through the interface unit, wherein the second one of the predetermined execution systems is selected according to whether or not tendency information is stored in the memory, wherein, when the tendency information is stored in the memory, the second one of the predetermined execution systems is selected from the plurality of predetermined execution systems according to the tendency information which specifies the second one of the predetermined execution systems in relation to the requested performance value, and wherein, when the tendency information is not stored in the memory, the second one of the predetermined execution systems is randomly selected from the plurality of predetermined execution systems.

2. The performance guarantee method in stream data processing according to claim 1, further comprising:

when the amount of the unprocessed input data increases and the estimated performance value does not satisfy the requested performance value, switching to a third one of the predetermined execution systems, and executing the stream data processing with the third one of the predetermined execution systems, and outputting output data, which results from the execution of the stream data processing with the third one of the predetermined execution systems, through the interface unit, wherein the third one of the predetermined execution systems is selected according to whether or not tendency information is stored in the memory, wherein, when the tendency information is stored in the memory, the third one of the predetermined execution systems is chosen from the plurality of predetermined execution systems according to the tendency information which specifies the third one of the predetermined execution systems in relation to the requested performance value, and wherein, when the tendency information is not stored in the memory, the third one of the predetermined execution systems is chosen randomly from the plurality of predetermined execution systems.

3. The performance guarantee method in stream data processing according to claim 1, wherein the second one of the predetermined execution systems satisfies the requested performance value.

4. The performance guarantee method in stream data processing according to claim 3, wherein when a switching time required for switching from the first one to the second one of the predetermined execution systems and a past performance value of second one of the predetermined execution systems specified by the tendency information in sum are less than the requested performance value, the second one of the predetermined execution systems is determined to satisfy the requested performance value.

5. The performance guarantee method in stream data processing according to claim 1, further comprising:

comparing a calculation accuracy of the output data, which results from the execution of the stream data processing on the unprocessed input data with the first one of the predetermined execution systems, to a requested accuracy; and when the estimated performance value falls below the requested performance value or the calculation accuracy falls below the requested accuracy, switching to the second one of the predetermined execution systems that satisfies both the requested performance value and the requested accuracy.

6. The performance guarantee method in stream data processing according to claim 1, further comprising:

changing a requested calculation accuracy of the output data; and when the requested calculation accuracy changes, determining a set of the predetermined execution systems having the lowest calculation times which meet the requested calculation accuracy.

7. A performance guarantee device in a stream data processing system, comprising:

an input data reception unit receiving input data;

a processing unit executing query processing on the input data;

a data transmission unit outputting execution results of the processing unit as output data;

a memory; and a request input unit receiving a requested performance value, wherein the processing unit:

includes a plurality of predetermined execution systems with different processing performances, including calculation accuracies and calculation times, to execute the query processing, acquires, upon execution of the query processing with a first one of the predetermined execution systems on the input data received via the input data reception unit, an input passage clock time when the input data passes through the input data reception unit, acquires an amount of the unprocessed input data when the input passage clock times are acquired, acquires output passage clock time when the output data, which results from the execution of the query processing on the input data with the first one of the predetermined execution systems, passes through the data transmission unit, stores the amount of unprocessed input data in association with performance information regarding the input passage clock times and the output passage clock times in the memory, estimates a performance value based on a comparison between a current amount of the unprocessed input data and a previous amount of the unprocessed input data associated with the performance information stored in the memory, compares the estimated performance value with a requested performance value, and when the estimated performance value falls below the requested performance value, switches to a second one of the predetermined execution systems, executes the query processing on the stream data with the second one of the predetermined execution systems, and outputting output data, which results from the execution of the stream data processing with the second one of the predetermined execution systems, through the data transmission unit,
  wherein the second one of the predetermined execution systems is selected according to whether or not tendency information is stored in the memory,
wherein, when the tendency information is stored in the memory, the second one of the predetermined execution systems is selected from the plurality of predetermined execution systems according to the tendency information which specifies the second one of the predetermined execution systems in relation to the requested performance value, and
wherein, when the tendency information is not stored in the memory, the second one of the predetermined execution systems is randomly selected from the plurality of predetermined execution systems.

8. The performance guarantee device according to claim 7, wherein the processing unit:
when the amount of the unprocessed input data increases and the estimated performance value does not satisfy the requested performance value, switches to a third one of the predetermined execution systems, and executes the stream data processing with the third one of the predetermined execution systems, and outputs output data, which results from the execution of the stream data processing with the third one of the predetermined execution systems, through the data transmission unit,
wherein the third one of the predetermined execution systems is selected according to whether or not tendency information is stored in the memory,
wherein, when the tendency information is stored in the memory, the third one of the predetermined execution systems is chosen from the plurality of predetermined execution systems according to the tendency information which specifies the third one of the predetermined execution systems in relation to the requested performance value, and
wherein, when the tendency information is not stored in the memory, the third one of the predetermined execution systems is chosen randomly from the plurality of predetermined execution systems.

9. The performance guarantee device according to claim 7, wherein the second one of the predetermined execution systems satisfies the requested performance value.

10. The performance guarantee device according to claim 9,
  wherein the processing unit:
  when a switching time required for switching from the first one to the second one of the predetermined execution systems and a past performance value of second one of the predetermined execution systems specified by the tendency information in sum are less than the requested performance value, the second one of the predetermined execution systems is determined to satisfy the requested performance value.

11. The performance guarantee device according to claim 7,
  wherein a requested accuracy of the output data is inputted from the request input unit, and
  wherein the processing unit:
  compares a calculation accuracy of the output data, which results from the execution of the stream data processing on the unprocessed input data with the first one of the predetermined execution systems, satisfies the requested accuracy of the output results, and
  when the estimated performance value falls below the requested performance value or the calculation accuracy falls below the requested accuracy, switches to the second one of the predetermined execution systems satisfying both the requested performance value and the requested accuracy.

12. The performance guarantee device according to claim 7,
  wherein a change in a requested accuracy of the output data is inputted from the request input unit,
  wherein the processing unit:
  when the requested accuracy changes, determining a set of the predetermined execution systems having the lowest calculation times which meet the requested accuracy.

13. The performance guarantee device according to claim 7,
  wherein the processing unit:
  stores identification information for a clock time at which switching to the second one of the predetermined execution systems occurred and an identifier of the second one of the predetermined execution systems.

* * * * *